United States Patent
Poland

Patent Number: 5,401,947
Date of Patent: Mar. 28, 1995

[54] INFORMATION DISPLAY AND PRODUCT IDENTIFICATION SYSTEM

[76] Inventor: Terrell A. Poland, 44 Hanover Rd., Newtown, Conn. 06470

[21] Appl. No.: 213,175

[22] Filed: Mar. 15, 1994

[51] Int. Cl.6 ............................................. G06K 15/00
[52] U.S. Cl. ................................. 235/383; 340/825.35
[58] Field of Search ............... 235/383; 340/825.35; 364/406

[56] References Cited

U.S. PATENT DOCUMENTS

| | | | |
|---|---|---|---|
| 4,002,886 | 1/1977 | Sundelin . | |
| 4,500,880 | 2/1985 | Gomersau et al. | 340/825.35 |
| 4,766,295 | 8/1988 | Davis et al. . | |
| 4,834,500 | 5/1989 | Hilsum et al. | 350/331 T |
| 4,888,709 | 12/1989 | Revesz et al. | 340/825.35 |
| 4,937,586 | 6/1990 | Stevens et al. | 340/825.35 |
| 4,962,466 | 10/1990 | Revesz et al. | 340/825.35 |
| 5,019,811 | 5/1991 | Olsson et al. | 340/825.35 |
| 5,111,196 | 5/1992 | Hunt | 235/383 |
| 5,172,314 | 12/1992 | Poland et al. | 235/383 |
| 5,198,644 | 3/1993 | Pfeiffer et al. | 235/383 |
| 5,202,677 | 4/1993 | Parker et al. | 359/44 |
| 5,245,534 | 9/1993 | Waterhouse et al. | 235/383 |

*Primary Examiner*—John Shepperd
*Assistant Examiner*—Peter J. Rashid

[57] ABSTRACT

An electronic pricing display system for displaying product information on display strips (24) attached to shelf edges. A strip controller (30) heats selected thermochromic ink markings (44) printed on display strips (24) to form price display segments. An encoder prints and programs product identifiers (14) at a regional center. Store personnel snap product identifiers (14) on top of display strip (24), thereby causing the system to display new product information for selected products along the display strip (24).

6 Claims, 4 Drawing Sheets

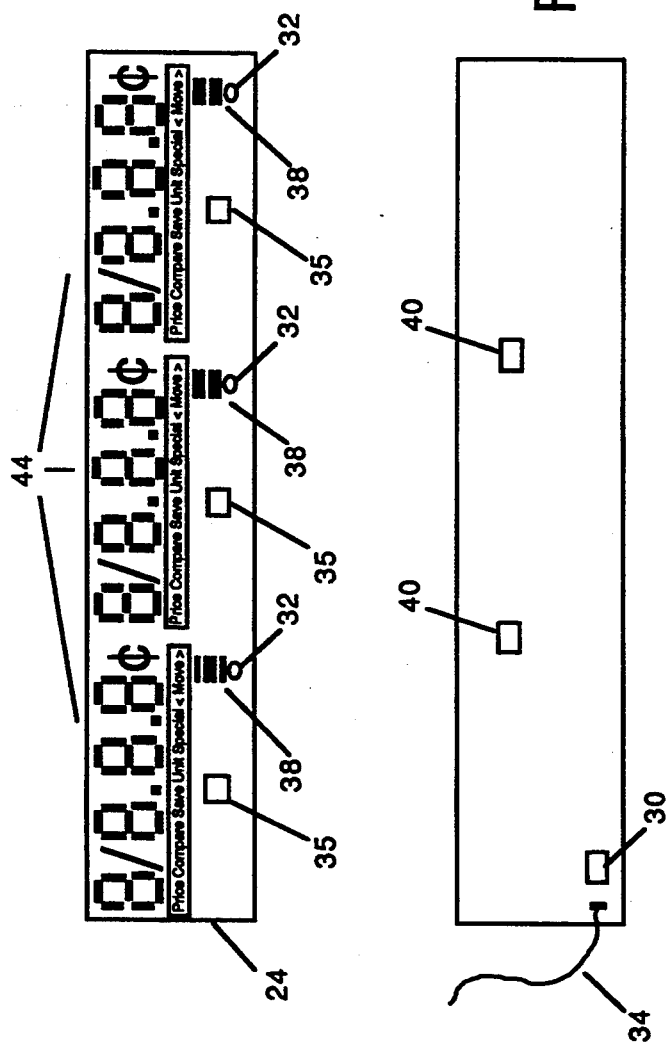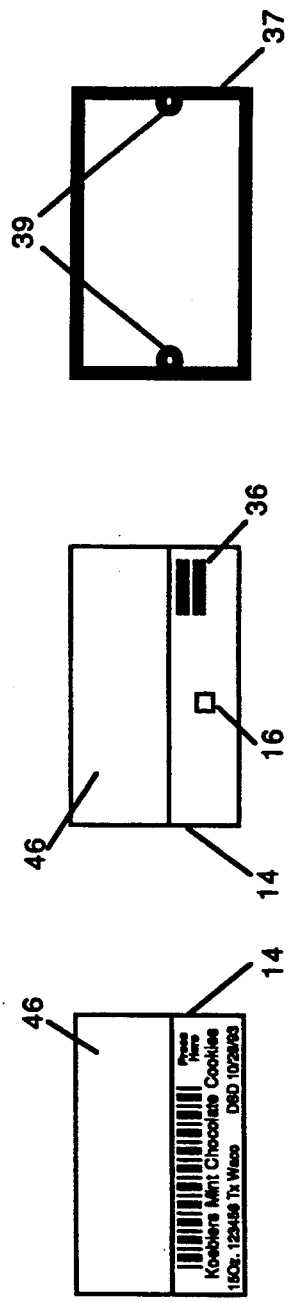

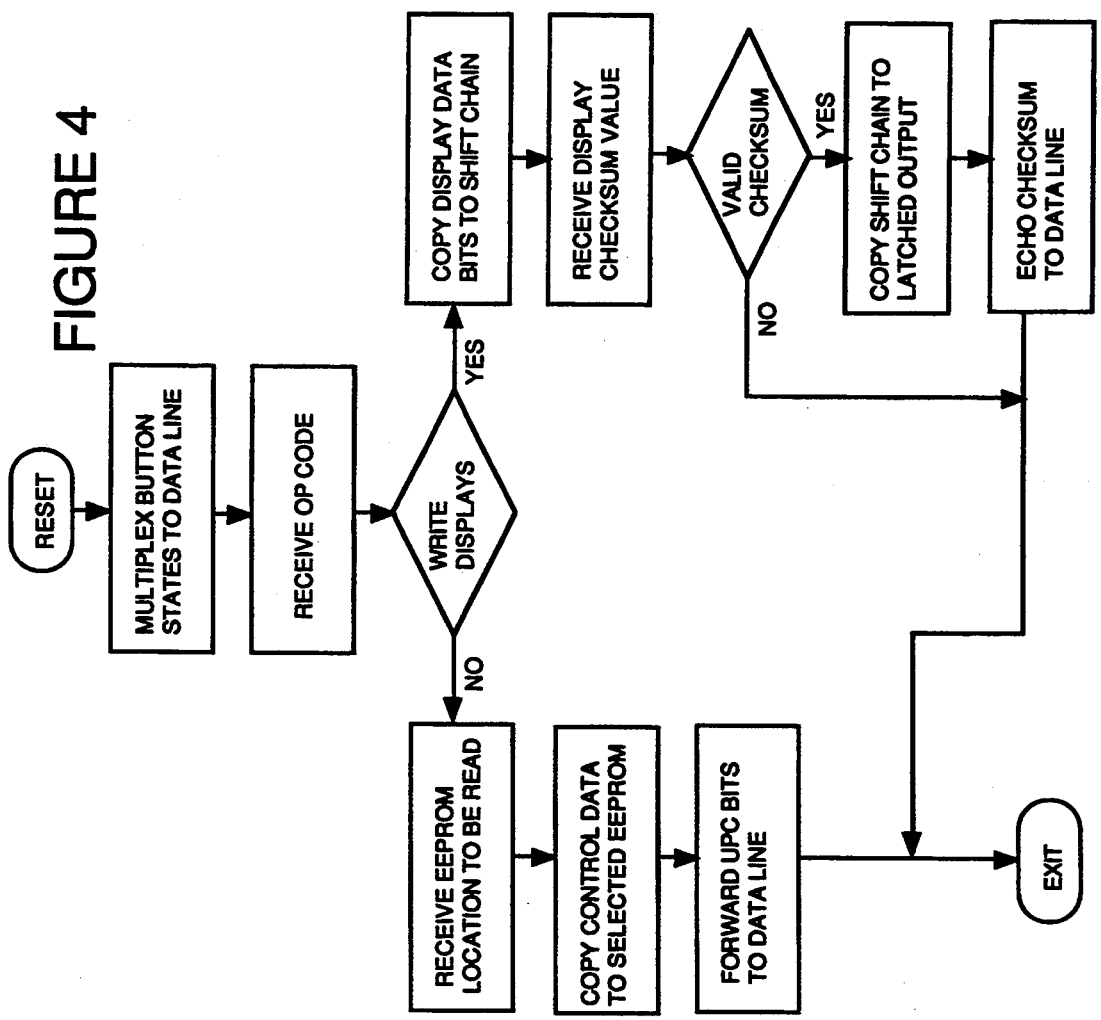

INFORMATION DISPLAY AND PRODUCT IDENTIFICATION SYSTEM

BACKGROUND

This invention relates to an electronic system for displaying current pricing information on retail product shelf edges and promotional signs, and more particularly to such a system which groups price displays into strips and updates them by the location determined by an electronic overlay rather than by an address programmed into each display module.

Heretofore, such as illustrated in U.S. Pat. No. 4,002,886, dated Jan. 11, 1977, electronic pricing display systems have utilized a movable display module containing circuitry for recognizing an address code for remotely selecting the module from a computer control system. U.S. Pat. No. 4,500,880, dated Feb. 19, 1985 illustrates using the retail Universal Product Code (UPC) number as the address code for the display modules.

A multiplicity of display modules are connected to a bus providing power and data. U.S. Pat. No. 5,245,534, dated Sep. 14, 1993 illustrates a mechanism for locating the presence of a movable display module on one of a multiplicity of said buses. The specificity of location detection is limited to the length of the shared bus. A person in the store must program the correct address into the display module. U.S. Pat. No. 4,766,295, dated Aug. 23, 1988 illustrates a method for programming addresses into wireless display modules using a handheld controller in the aisle.

All such programming procedures place additional responsibilities on store personnel to assign addresses accurately. My invention bonds the product electronic identification onto a display overlay which is printed and programmed simultaneously. This assures consistency between the electronic information and the human readable information. A separate shelf strip provides the display mechanism for showing product prices for whatever overlays are placed on top of the strip.

SUMMARY OF THE INVENTION

The present invention discloses a system for displaying a multiplicity of products' prices on a single printed strip snapped into the front edge of the product shelf and extending the entire length of the shelf edge. Each product has a movable plastic overlay which snaps into the shelf edge on top of the display strip. A controller bonded to the display strip produces a visible image by heating segments of thermochromic liquid crystal ink printed on the strip. The plastic overlay causes the image to appear as black markings behind a transparent filter.

Each product's plastic overlay is encoded with an electronically readable address as well as printed descriptive markings. The printed markings and the UPC electronic address are established at the same time through an encoding process at a regional distribution center. When the printed overlays arrive at the stores, they are already accurately programmed. This assures that the human readable markings and the electronic identifiers are consistent. An aisle controller fetches the product UPC number from an Electrically Erasable Programmable Read Only Memory (EEPROM) die embedded in the plastic overlay when a person presses the overlay against a membrane keypad and communications ports on the display strip at one of the evenly spaced positions located along the strip. Note that this number serves to identify only the product at the location whose keypad was pressed. It is not used as an address to update the price display.

A store host computer sends price files to a store tag computer. The purpose of the store tag computer is to distribute price information to the aisle controllers over a multipoint modem interface. Only the aisle controllers have addresses established for them. Any convenient identifier will suffice such as the number of the aisle where the controller is located. The aisle controller sends control commands to each gondola controller on a different serial port for each gondola controller. Likewise, each strip controller has a direct connection to a port reserved for it on the gondola controller.

The aisle controller places new product data into the position in a buffer corresponding to the location directly underneath the newly mounted plastic overlay, between the data for any other products already on the same shelf. It forwards the updated display data for the entire shelf to the gondola controller which sends it to the strip controller that responded with the mounted overlay status. If the new product location is incorrect, the aisle controller leaves the price display data blank at the incorrect strip position and asserts the annunciator data to guide the store person as to which direction to move the plastic overlay.

The strip controller forwards the display data to a series of shift registers which drive output currents routed to high impedance printed resistor traces, thereby heating selected segments of the display strip. This temperature increase causes normally transparent thermochromic liquid crystal ink markings printed on the strip to reflect only blue light. The orange filter in the plastic overlay blocks the blue reflection so as to produce a black image on an orange background. The segments on the shelf strip controller are arranged so as to form numeric digits and simple annunciators.

The gondola controller assures that the segments having elevated temperatures will not be overheated. It uses an analog sensor to calculate the duty cycle needed to maintain the thermochromic ink printed above the heater segments in the proper pitch to reflect only blue light. If the ambient temperature rises, the gondola controller occasionally sends a blank display stream to the strip controller. After a calculated, brief interval, it then resends the active display stream to the strip controller.

BRIEF DESCRIPTION OF THE DRAWINGS

Exemplary embodiments of the invention are described with reference to drawings, of which:

FIG. 2A is a graphic representation of a shelf display strip showing the placement of thermochromic ink, membrane keypads and overlay communication pads;

FIG. 2B is a graphic representation of a shelf display strip showing the placement of the strip controller die, gondola controller interface cable and shift register dies;

FIG. 3A is a graphic representation of the front side of a plastic overlay showing printed product markings;

FIG. 3B is a graphic representation of the rear surface of a plastic overlay showing the placement of the UPC EEPROM and communications ports;

FIG. 3C is a graphic representation of a spring steel clip for keeping plastic overlays in position on the shelf display strip;

FIG. 4 is a flowchart of the program embedded in the rail strip microcontroller.

DETAIL DESCRIPTION OF THE INVENTION

Figure 1:
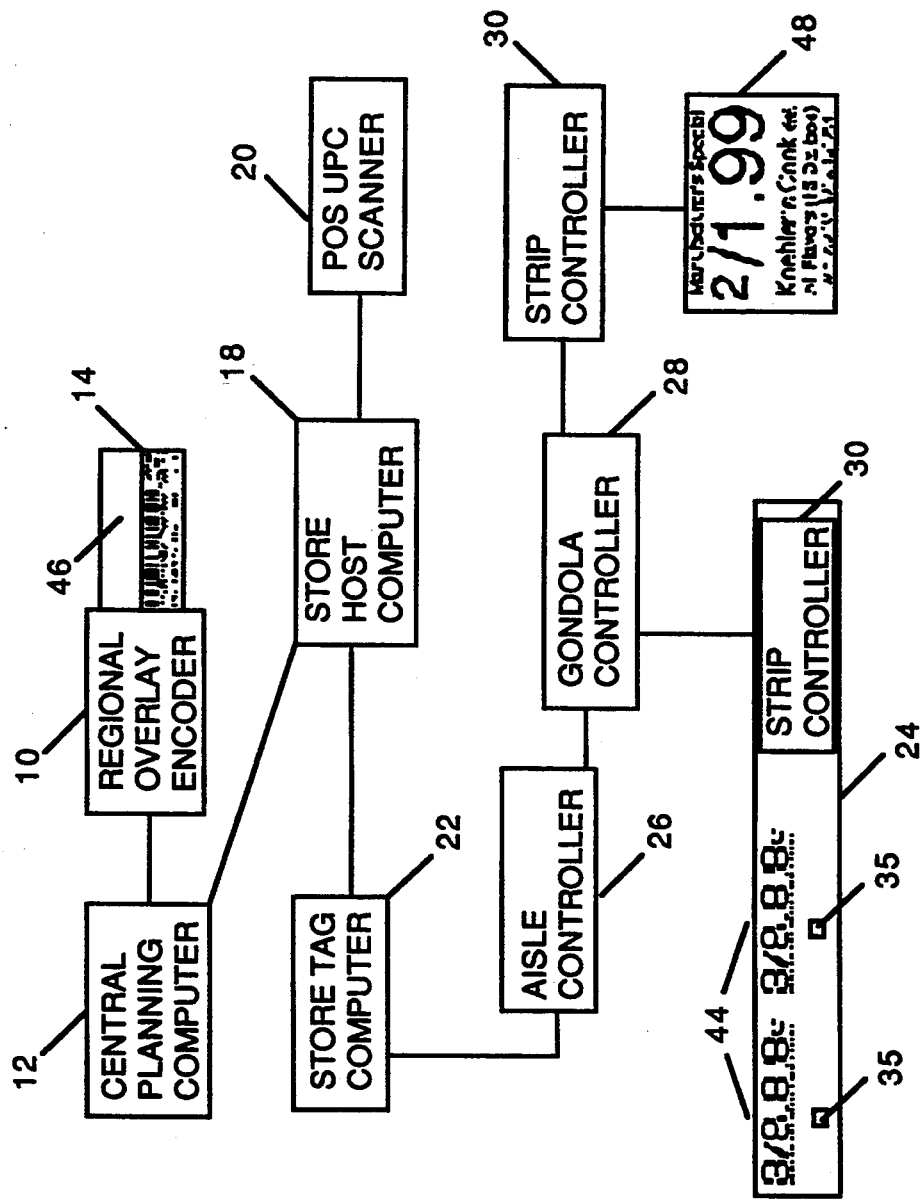
FIG. 1 is a block diagram of the herein disclosed retail pricing display system illustrating an overlay encoder, store computers, Point Of Sale (POS) scanner, tag controllers, display strips and promotional sign.

Referring now to the drawings, FIG. 1 shows an electronic pricing display system including an overlay encoder 10 generally located at a central location other than an individual store. Encoder 10 receives descriptive information for new products from a centralized planning computer 12. Encoder 10 prints markings on a plastic overlay 14 and programs an EEPROM die 16 bonded to the rear surface of overlay 14. To simplify operations encoder 10 may include a transport mechanism to convey overlay 14 from a printing station to an EEPROM programming station. The technique for setting a product number in EEPROM die 16 is similar to that used in reading its value when it is mounted on a shelf display strip 24, as described later.

Planning computer 12 sends a product price file, product promotion file and optionally a product location file to a host computer 18 in each of the retail stores. Host computer 18 sends the price files to a multiplicity of POS UPC scanners 20 and a store tag computer 22 at the same time. The product locations and promotions files accompany the price file. Tag computer 22 examines a table in its memory to determine where to send the price display data. A program in tag computer 22 updates the product location table in its memory when a store person presses overlay 14 into one of a multiplicity of positions on an electronic shelf display strip 24. Tag computer 22 detects the occurrence of overlay 14 being mounted on display strip 24 by polling an aisle controller 26 at a frequent interval. Each aisle controller 26 in turn polls each of a multiplicity of gondola controllers 28 on separate serial ports for a change in status of any of the display strips 24 attached to shelves on the same gondola.

FIG. 2A and FIG. 2B show two views of a display strip 24 illustrating respectively, a printed layer visible to the consumer, and positioning of bonded components on its rear surface. A strip controller 30 reads the status of a multiplicity of membrane keypads 32 evenly spaced along display strip 24. Gondola controller 28 communicates with strip controllers 30 on separate serial ports by asserting control signals in a multiplicity of cables 34 comprised of strip controller 30 power, ground, clock, reset, serial data and serial clock and EEPROM 16 power and ground.

FIG. 3A and FIG. 3B show two views of an overlay 14, illustrating respectively printed markings visible to the consumer, and positioning of bonded components on its rear surface. A store person snaps overlay 14 into the front edge of the gondola shelf against strip 24, such that EEPROM 16 extends into hole 35, thereby securing overlay 14 in a rigid position. He also snaps a spring steel clip 37, shown in FIG. 3C, on top of overlay 14 to prevent casual removal of overlay 14. He then presses membrane keypad 32 such that communications port contacts 36 comprised of EEPROM 16 power, ground and serial data come into contact with communication port contacts 38 protruding from a protective shellac coating as rounded bumps on display strip 24.

FIG. 4 is a flowchart of the operation of strip controller 30. When gondola controller 28 asserts a reset control line, strip controller 30 sends the status of each of membrane keypads 32 connected to it to gondola controller 28. When gondola controller 28 informs aisle controller 26 of any mounted overlay events, aisle controller 26 supplies EEPROM 16 power and ground in cable 34, then instructs gondola controller 28 to fetch the UPC number programmed into overlay 14. Gondola controller 28 sends strip controller 30 a Read operation code and the location on strip 24 to enable for EEPROM 16 serial data transfers corresponding to the number of the membrane keypad 32 being pressed. Strip controller 30 performs a transceiver function for gondola controller 28 to obtain the UPC number from overlay 14. When gondola controller 28 obtains and forwards the product number, aisle controller 26 forwards the UPC number, gondola controller 28 port number, strip controller 30 port number and membrane keypad 32 number to tag computer 22 and deactivates EEPROM 16 power supply in cable 34. This prevents ion migration across the exposed communication port contacts 38.

Tag computer 22 searches the product location table in its memory to determine whether the store person mounted overlay 14 in the proper location. If the aisle is correct, tag computer 22 sends all of the display data for the new product to aisle controller 26 which in turn verifies the correct location determined by the particular strip controller 30 and gondola controller 28. If the precise location of overlay 14 is correct, aisle controller 26 embeds the product's display data in a display buffer and sends the buffer for the entire display strip 24 to the particular gondola controller 28, which in turn forwards it to the particular strip controller 30 by sending a Write operation code.

Figure 5:
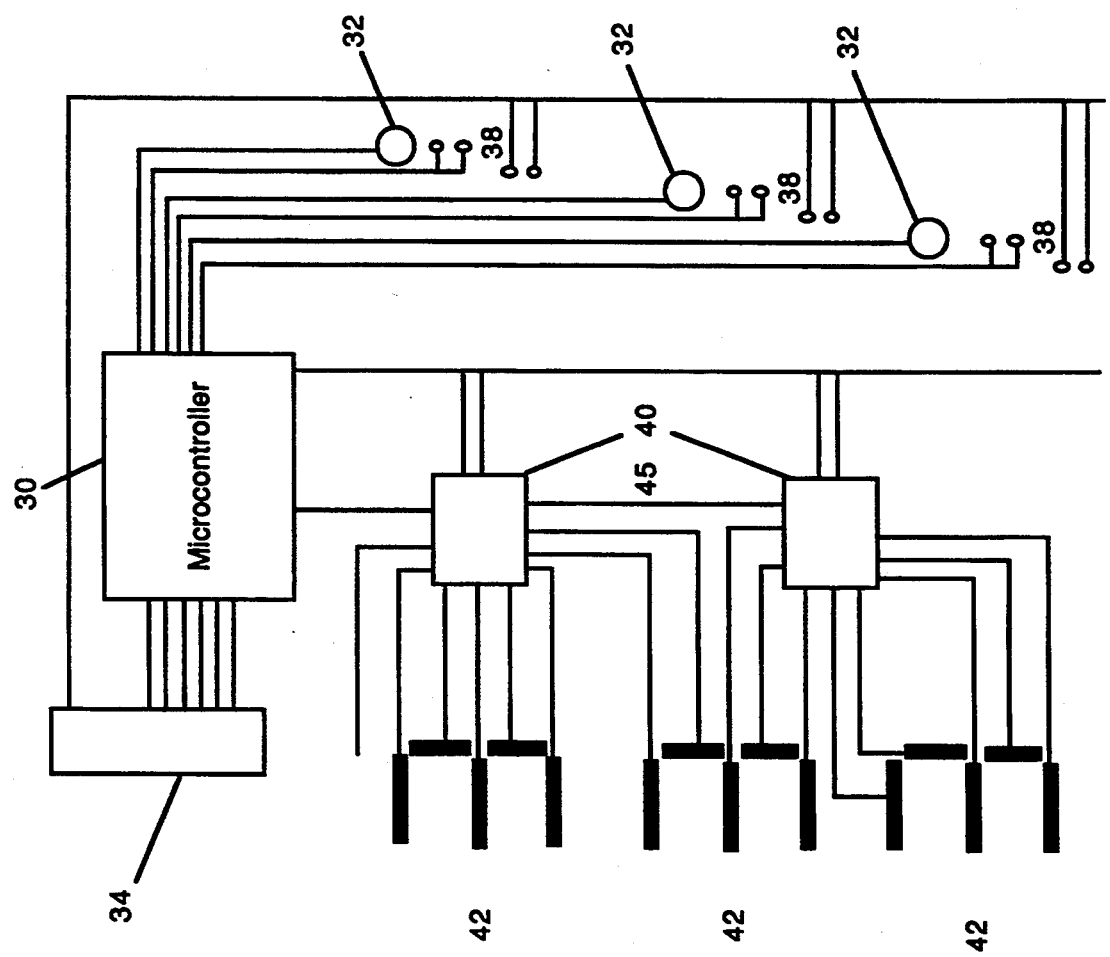
FIG. 5 is a block diagram of the display strip microcontroller, cable connector, shift register chain, display segments, membrane keypads and EEPROM communications ports.

FIG. 5 illustrates a preferred embodiment of the invention's objective of displaying a multiplicity of product data on a display strip 24 utilizing a cascaded chain of serial to parallel shift registers 40 having latched output drivers connected to printed resistor traces 42. Each of shift registers 40 passes display data bits shifted from its last position as input to a subsequent shift register 40 using a ripple carry line 45. Strip controller 30 forwards display control bits to the first shift register 40 while computing a checksum across all of the bits sent from gondola controller 28. If the computed checksum matches the received checksum following all of the display bits, strip controller 28 asserts a Load control input to all of shift registers 40, then echoes the checksum back to gondola controller 28. Shift registers 40 enable output drivers corresponding to enabled display bits.

Current flowing through selected traces 42 elevates the temperature of thermochromic ink markings 44 printed on display strip 24 above a layer of white background ink. After a variable time interval dependent on the ambient temperature, markings 44 reflect light of only the blue wavelength. An orange transparent filter 46 embedded in overlay 14 blocks the blue reflected light thereby presenting an image comprised of black markings on an orange background. The threshold temperature at which thermochromic markings 44 change from transparent to visible is tailored to suit the typical ambient temperature intended for a particular category of display strip 24. For instance, system installers attach display strips 24 with lower temperature thresholds inside freezer cases than in open aisles.

Annunciators printed in thermochromic markings 44 provide guidance to store personnel and consumers. In the event that tag computer 22 receives an invalid aisle number for a newly mounted overlay 14, it sends an error condition packet to aisle controller 26 indicating the aisle number of the correct location. Aisle controller 26 embeds, for a brief interval lasting a few seconds, the aisle number and the Move annunciator control bit into the buffer for the display located at the position of the depressed membrane keypad 32. In the event that the new position's aisle number is correct, but the shelf location is incorrect, aisle controller 26 sends buffers to display guiding hints comprised of arrow annunciators and display segments arranged to form indications such as LO or HI. After a fixed interval of a few seconds, it blanks the display.

If host computer 18 has not sent tag computer 22 a prescribed product location file, tag computer 22 creates an actual product location file by updating a table in its memory as each overlay 14 is mounted. This process assures that all future POS price display data will be sent to the proper aisle controllers 26.

In the event that tag computer 22 receives a missing UPC number when a person presses a membrane keypad 32, it sends an exception condition packet to aisle controller 26 to indicate that the price display buffer for that location needs to be blanked. In the event that a product has been discontinued, this is not an error condition. FIG. 3C illustrates removal flanges 39 which aid store personnel in removing the steel clip 37 securing overlay 14 to shelf display strip 24 for discontinued items.

In the event that aisle controller 26 receives a UPC number at a location already occupied by the same UPC number, it may optionally begin sending price display buffers in a timed sequence to present multiple datum on the same location. Annunciators differentiate the meaning of a particular instance of the display markings 44 at a given time, such as Price, Compare, Save and Unit.

In the preferred embodiment, another annunciator marked Special indicates that an item is being promoted. Store management may desire a more noticeable indication of special items so as to get the consumer's attention. A conditional display mode activated by an overlay 14 having a UPC number reserved for this purpose helps store personnel mount plastic banners of various types near products being promoted. For instance, when a store person mounts the particular overlay 14 having a UPC number reserved for the New Items Only display mode, aisle controller 26 inspects the product promotions table in its memory for any products flagged as New Items that are located within a few feet of the overlay 14 which activated the particular conditional display mode. Aisle controller 26 sends alternate display buffers for a few seconds causing display markings 44 to be blanked for those items that are not New Items.

Stores often have special signs promoting items having discounted prices. The preferred embodiment of this invention includes large electronic promotional signs 48 as illustrated in FIG. 1. Sign 48 is constructed much like display strip 24, with the addition of extra shift registers 40 to drive a larger display area with more thermochromic markings 44. When a store person presses an overlay 14 onto communications port 38 of sign 48, aisle controller 26 sends a display buffer containing the product's description, price and promotional data to sign 48 for the product whose UPC number was obtained from overlay 14. At the cost of additional memory in EEPROM 16, overlay 14 may contain the product's description in addition to its UPC number.

Solar loading may increase the overall temperature of a promotional sign 48 or display strips 24 that are facing a window. To prevent excessive heating of thermochromic markings 44, gondola controller 28 includes an analog temperature sensor, comparator and timer. When the ambient temperature approaches the visibility threshold temperature for markings 44, gondola controller 28 switches to an alternating display buffer mode where the duty cycle of actively driven segment bits is reduced as the ambient temperature rises.

In summary, a novel electronic price display and promotional system has been disclosed. Use of inexpensive plastic strips, conductive and thermochromic ink printing and die bonding reduces the manufacturing cost of the disclosed system. This makes the benefits of a digital pricing system affordable to a broader community of retail stores.

In alternate embodiments, other electronic circuits could be used in the display strip 24 or the overlay 14. For example, a customized gate array could perform the functions of the strip controller 30 or the EEPROM 16. Likewise a microcontroller could be used on overlay 14 instead of EEPROM 16. The extra intelligence could enable position identification with fewer control lines in strip controller 30. This could employ position markings sensed by an intelligent overlay 14. Alternatively, it could employ a broadcast query command to correlate a newly mounted overlay 14 to a pressed keypad 32.

While the invention is illustrated by the embodiments in the above detailed description, it is not limited by these embodiments but rather by the scope and the spirit of the claims which follow.

What is claimed is:

1. A computer-driven, electronic display system, comprising:
   a computer having product information data;
   a display strip permanently mounted on an edge of a product shelf, said display strip having:
   a plurality of sets of display markings located at fixed positions along said display strip;
   means for transmitting said product information data from said computer to said display markings;
   a plurality of sets of communications contacts located at fixed positions along said display strip, each set of contacts having connections providing power and data transfer lines; and
   a plurality of removable electronic product identifiers, separate and distinct from said display strip, each having:
   a surface for insertion at one of said fixed positions on said display strip;
   a set of communications contacts for connecting to said power and said data transfer lines from said display strip; and
   externally programmable memory locations, said means comprising a product identification number and said means responsive to said data transfer lines;

whereby an individual inserts each product identifier into said display strip causing transfer of information to a particular set of said display markings located where each product identifier is in contact with said display strip.

2. The system of claim 1, wherein the display markings are comprised of printed ink containing thermochromic liquid crystals, each display marking being heated by a printed conductive ink trace, each trace having a high resistance to electrical current.

3. The system of claim 2, wherein the computer further comprises a temperature sensor, a comparator, and a timer for regulating said output current to said conductive ink thereby limiting heating in said display markings.

4. The system of claim 2, wherein the display markings are further comprised of a plurality of inks, each ink having a different spiral pitch, each pitch corresponding to the ambient temperature of one of a plurality of geographic areas.

5. The system of claim 1, further comprising:
a source of computer based information in the form of prescribed geographic locations for a plurality of products; and
a comparator located in said computer for testing equality of said prescribed locations and insertion positions of each product identifier on said display strip; and
annunciators in said display markings providing visual guidance for an individual to move each product identifier located at positions failing said equality test.

6. The system of claim 1, wherein a plurality of numbers is reserved in said memory means in each product identifier for activating means in said computer, whereby said computer transmits an alternate category of product information to a plurality of said display markings located in geographical proximity to a position on said display strip into which each product identifier having one of said reserved numbers is inserted.

* * * * *